Patented Apr. 28, 1953

2,636,857

UNITED STATES PATENT OFFICE 2,636,857

METHOD OF CONTROLLING THE VISCOSITY OF DRILLING MUDS

William E. Bergman, Bartlesville, Okla., assignor to Phillips Petroleum Company, a corporation of Delaware No Drawing. Application November 22, 1948, Serial No. 61,531

5 Claims. (Cl. 252—8.5)

This invention relates to a method of treating aqueous drilling muds. In a specific aspect, it relates to a method of controlling the thixotropic properties of aqueous drilling muds. In a still more specific aspect, it relates to a method of controlling the viscosity of aqueous drilling muds.

In the art of rotary drilling, the use of a drilling mud is well understood by those familiar with the art. Such a drilling mud has at least three distinct functions, namely:

(1) It washes the face of the formation being drilled and carries the cuttings to the surface, where they are removed from the fluid.

(2) It creates a hydrostatic pressure against the walls of the well and thereby prevents caving of the formations and the flow of high pressure streams, of oil or water, into the bore hole.

(3) It acts as an agent to form a filter cake on the walls of the well and prevent the loss of water from the drilling fluid into the formations penetrated, which in turn, reduces the swelling and caving of heaving shales or the like.

In order to perform the desired functions, it is necessary that the drilling mud have a sufficiently high viscosity to permit the use of weighting agents to increase the density of the mud and also enable the mud to carry heavy cuttings to the surface. Since it is desired that the cuttings be carried along by the mud stream from the bottom of the well to the surface and also that these cuttings settle out in the mud pit, the viscosity of the mud must be carefully controlled. It is possible to increase the efficiency of the mud for carrying heavy cuttings to the surface by increasing the velocity of the stream. However, with a mud of fairly high viscosity, a small increase of the velocity of the stream puts a considerably increased load on the pumping equipment.

Since the greatest danger from settling of the rock cuttings occurs when the circulation of the mud is stopped, as in the case of a shut down, it is possible to drill with a mud of fairly low viscosity by using a drilling mud which gels when it is allowed to remain quiescent. Certain of the clays, especially those of the bentonitic type have gel-forming properties which makes them useful in drilling muds. These gel-forming clays are highly colloidal in nature and are primarily responsible for the stability, the viscosity, and the pore sealing as well as gel characteristics of the mud. They are usually of the bentonitic type of clays and have a high affinity for water.

Drilling muds generally have a pH between 8.0 and 13.0 and preferably between 9.0 and 12.0. The use of an acid mud is almost unheard of because of the corrosion problem that would exist and also because the colloidal matter responsible for the desired mud characteristics would be flocculated in an acid medium. For these and other reasons, aqueous drilling muds are almost universally maintained at a pH higher than 7.0.

One harmful effect, which it is impossible to overcome completely, in drilling is that some colloidal material is added to the fluid from the formations penetrated. When using a mud of a pH of around 10 to 12, the colloidal clay particles from the formations are converted to sodium clays which, as explained before, have a high affinity for water and which become a part of the mud. This results in a gradual increase in the viscosity of the drilling mud with continued use.

It is present practice to lower the viscosity of drilling muds or to prevent any inordinate increase in the viscosity by the addition to the mud of tannates, of which quebracho is the most widely used. Quebracho is generally obtained in the acid form which is insoluble in water; and in adding it to drilling muds, the usual practice is to add approximately an equal amount of caustic to prevent lowering the pH of the mud and also to convert the quebracho to its alkaline salt, which is soluble in water and is effective for reducing the viscosity.

I have discovered that it is possible to bring about an increased viscosity lowering if a small amount of a water-soluble inorganic salt of a polyvalent metal is added to the mud at the time the quebracho is added.

It is therefore an object of my invention to provide a method for treating aqueous drilling muds.

It is another object of my invention to provide a method of controlling the thixotropic properties of aqueous drilling muds.

It is still another object of my invention to provide a method of controlling the viscosity of aqueous drilling muds.

Other objects and advantages of my invention will be more apparent to those skilled in the art upon reading the following detailed description and claims.

Operation

In practicing my invention for controlling the viscosity of aqueous drilling muds, I add caustic and quebracho under the same conditions and circumstances as previously. However, at the time of adding the quebracho or immediately before or thereafter, I also add a small amount of a water soluble inorganic salt of a polyvalent metal, the preferred amount being from 0.01 to 4.0 pounds of salt per barrel of drilling mud. It is usually not necessary to add more of the water soluble inorganic salt than about 0.5 pound per barrel of drilling mud. Within the group designated as water soluble inorganic salt of polyvalent metal, I intend to include those salts of amphoteric metals such as sodium aluminate which have the polyvalent metal in the anion of the molecule. By water soluble, I mean to include only those salts whose solubility in water at ordinary temperatures is greater than one gram per one-thousand grams of water.

Compounds such as sodium aluminate have been used for increasing the viscosity of drilling muds. Therefore, it is quite unusual and unexpected that when used simultaneously with quebracho and caustic, the viscosity of the mud will be lowered.

The viscosity lowering achieved by adding a water soluble inorganic polyvalent salt to the drilling mud along with quebracho and caustic is greater than the viscosity lowering that could be realized by the addition of caustic and quebracho alone in equivalent amounts. The use of my inorganic metal salts therefore reduces the amount of additive necessary to bring about the desired viscosity lowering and results in a considerable saving in quebracho.

In practicing my invention, it is necessary that the inorganic metal salt be added at approximately the same time as the quebracho. For instance, it may not be operative if the caustic and quebracho are added to the drilling mud and several hours later a salt is added, and in fact, the addition of sodium aluminate at such a later time may result in a viscosity increase rather than a decrease. For this reason, I prefer to add at least a portion of the inorganic salt with the quebracho. It is known that certain salts, such as sodium aluminate will react with quebracho to form a lake. It is believed that all of these inorganic salts of my invention react in this way and for this reason, it is necessary that the salts be added along with or at approximately the same time as the quebracho.

I have found that better results are obtainable if the quebracho to caustic ratio is maintained near unity.

By practicing my invention, it is possible to improve the gel characteristics of the drilling mud, in that the initial and final gel strengths of drilling muds are lowered by the addition of an inorganic polyvalent metal salt.

The addition of the salts of my invention does not have any detrimental effect on a drilling mud insofar as water loss and pH are concerned. My salts do not interfere with or impair the effectiveness of other additives such as sodium carboxymethylcellulose, which is usually added to reduce the water loss. Muds to which my inorganic salts have been added, according to the method previously explained, are not seriously hurt by contamination with normal amounts of salt.

When, in drilling with a mud having a pH of about 12.2 or above, it becomes necessary to add caustic to the system, the addition of even a small amount generally produces an inordinate increase in the viscosity of the drilling mud, the reduction of which, if it can be brought about at all, requires a considerable amount of quebracho. My invention is particularly effective in such a situation because the addition of even a small amount of a salt, for instance, sodium aluminate along with an amount of quebracho considerably less than is required under ordinary circumstances will prevent this inordinate viscosity rise. While the advantages of my invention can be realized at lower pH values, at above about 12.0, the advantage is of considerable magnitude.

My invention will be more clearly explained and demonstrated by the following tests, which are representative of those tests performed in determining the efficiency of my invention. The physical properties of the various muds were determined according to the standard procedures (API Code 29).

TEST I

To a 4.8 per cent suspension of bentonite were added the kind and amounts of ingredients shown in the following table. The mixtures were stirred for 30 minutes and the indicated tests were run with the following results:

TABLE 1

| Test No. | NaOH lb./bbl. | Quebracho, lb./bbl. | NaAlO$_2$ lb./bbl. | Viscosity cps. | Initial gel, gm. | 10 min. gel, gm. | pH |
|---|---|---|---|---|---|---|---|
| 1 | 2 | 0.5 | 0 | 30 | 0 | 12 | 12.5 |
| 2 | 2 | 0.5 | 0.05 | 8.0 | 0 | 2 | 12.5 |
| 3 | 2 | 0.5 | 0.10 | 7.5 | 0 | 3 | 12.5 |
| 4 | 2 | 0.5 | 0.20 | 8.5 | 0 | 1 | 12.6 |
| 5 | 2 | 1.0 | 0 | 17.5 | 0 | 5 | 12.5 |
| 6 | 2 | 1.0 | 0.10 | 9.0 | 0 | 0 | 12.5 |
| 7 | 2 | 1.0 | 0.20 | 6.5 | 0 | 0 | 12.5 |
| 8 | 2 | 1.0 | 0.40 | 8.5 | 0 | 0 | 12.6 |

TEST II

In order to determine the effectiveness of my method for treating drilling muds containing sodium chloride, a 4.8 per cent suspension of bentonite to which was added one pound of sodium chloride per barrel and the varying amounts of the other chemicals indicated in the table were mixed as in Test I and the properties were determined with the results as shown.

TABLE 2

| Test No. | NaOH, lb./bbl. | Quebracho, lb./bbl. | NaAlO$_2$, lb./bbl. | Viscosity, cps. | Initial gel, gm. | 10 min. gel, gm. | pH |
|---|---|---|---|---|---|---|---|
| 1 | 1 | 0.5 | 0.00 | 27.5 | 0 | 20 | 12.0 |
| 2 | 1 | 0.5 | 0.05 | 18 | 0 | 15 | 12.0 |
| 3 | 1 | 0.5 | 0.10 | 8 | 0 | 10 | 12.1 |
| 4 | 1 | 0.5 | 0.20 | 7 | 0 | 10 | 12.1 |
| 5 | 2 | 0.5 | 0.00 | 28 | 3 | 25 | 12.5 |
| 6 | 2 | 0.5 | 0.05 | 8.5 | 0 | 12 | 12.5 |
| 7 | 2 | 0.5 | 0.10 | 7.5 | 0 | 5 | 12.5 |
| 8 | 2 | 0.5 | 0.20 | 7.5 | 0 | 5 | 12.6 |

TEST III

In order to determine the effectiveness of my invention in treating drilling muds to which organic water loss reducers had been added, to a 4.8 per cent suspension of bentonite to which was added two pounds of caustic soda per barrel and one pound of sodium carboxymethylcellulose per barrel, the indicated amounts and kinds of chemicals and the physical properties of the resulting mud were determined as in Test I. The results were as indicated in the following table.

TABLE 3

| Test No. | Quebracho, lb./bbl. | NaAlO$_2$, lb./bbl. | Viscosity, cps. | Initial gel, gm. | 10 min. gel, gm. | pH |
|---|---|---|---|---|---|---|
| 1 | 0.5 | 0 | 63 | 8 | 50 | 12.4 |
| 2 | 0.5 | 0.05 | 43 | 4 | 40 | 12.5 |
| 3 | 0.5 | 0.10 | 37 | 2 | 25 | 12.5 |
| 4 | 1.0 | 0 | 43 | 1 | 27 | 12.5 |
| 5 | 1.0 | 0.10 | 41 | 0 | 15 | 12.4 |
| 6 | 1.0 | 0.20 | 36 | 0 | 10 | 12.5 |

TEST IV

The following tests were run to determine the effectiveness of my invention in the drilling mud made up of 4.8 per cent suspension of bentonite, to which was added one pound of sodium chloride per barrel, two pounds of caustic soda per barrel, and one pound of sodium carboxymethylcellulose per barrel along with the kinds and amounts of other chemicals as indicated. The results were as shown in Table 4.

TABLE 4

| Quebracho, lb./bbl. | NaAlO$_2$, lb./bbl. | Viscosity, cps. | Initial gel, gm. | 10 min. gel, gm. | pH |
|---|---|---|---|---|---|
| 0.5 | 0 | 68 | 15 | 80 | 12.5 |
| 0.5 | 0.05 | 38 | 2 | 40 | 12.6 |
| 0.5 | 0.10 | 45 | 2 | 50 | 12.7 |
| 1.0 | 0 | 53 | 5 | 60 | 12.4 |
| 1.0 | 0.10 | 41 | 1 | 40 | 12.5 |
| 1.0 | 0.20 | 35 | 0 | 30 | 12.5 |

TEST V

Tests were run to determine the effect of the order of addition of the required chemicals in practicing my invention. To a 4.8 per cent suspension of bentonite base mud, were added one pound of sodium chloride per barrel, two pounds of caustic soda per barrel, one pound of quebracho per barrel and the indicated amounts of sodium meta-aluminate in various manners with the indicated results. In the following table, by technique A, the caustic soda, quebracho, and sodium aluminate were added to the bentonite suspension simultaneously. By technique A-1, the addition of the products was the same as in technique A except that the quebracho was made into an alkaline solution and aged for 11 days at room temperature before using. By technique B, the caustic and quebracho were added together and the sodium aluminate was added immediately thereafter. By technique C, the sodium aluminate was added first and an alkaline-quebracho solution afterward. By technique D, the caustic, quebracho and sodium aluminate were put into solution, boiled and cooled before being added to the bentonite suspension. The results were as shown in the following table.

In all of these tests, an aqueous suspension of bentonite was used as the base mud. The alteration in the properties of a drilling mud brought about by the addition of various chemicals is a result of the effect of the additive on the bentonite present in the mud. The ordinarily used weighting agents or other suspended material does not interfere with the carrying out of my invention.

TABLE 5

| Test No. | NaAlO$_2$, lb./bbl. | Technique | Viscosity, cps. | Initial gel, gm. | 10 min. gel, gm. | pH |
|---|---|---|---|---|---|---|
| 1 | 0 | A | 20 | 0 | 15 | 12.5 |
| 2 | 0.1 | A | 10 | 0 | 18 | 12.5 |
| 3 | 0.4 | A | 8 | 0 | 2 | 12.6 |
| 4 | 0 | A-1 | 24 | 0 | 25 | 12.3 |
| 5 | 0.1 | A-1 | 12 | 0 | 13 | 12.3 |
| 6 | 0.4 | A-1 | 8 | 0 | 1 | 12.4 |
| 7 | 0 | B | 27 | 0 | 30 | 12.3 |
| 8 | 0.1 | B | 7 | 0 | 4 | 12.4 |
| 9 | 0.4 | B | 6 | 0 | 0 | 12.4 |
| 10 | 0 | C | 20 | 0 | 15 | 12.5 |
| 11 | 0.1 | C | 12 | 0 | 15 | 12.4 |
| 12 | 0.4 | C | 8 | 0 | 15 | 12.4 |
| 13 | 0. | D | 28 | 0 | 25 | 12.4 |
| 14 | 0.1 | D | 14 | 0 | 13 | 12.5 |
| 15 | 0.4 | D | 12 | 0 | 17 | 12.5 |

TEST VI

In order to test the effect of the addition of a single chemical upon the muds which had been previously treated according to my invention, to the indicated samples from Test V after treatment were added the following indicated amounts and kinds of additives. It should be noted, in connection with the following table, that in the case of sample 3, which was mud from Test No. 7, Table 5, the addition of a small amount of sodium aluminate to a drilling fluid containing caustic and quebracho but no sodium aluminate resulted in a plastic mass. On the other hand, in the case of sample 6, which was mud 8 from Test No. 8, Table 5, the addition of the same amount of sodium aluminate to a mud which had been previously treated according to my invention resulted in a decrease in the viscosity. Other results were as indicated in Table 6. The selected muds from Table 5 were aged for 20 hours at 95° C. before the tests reported in Table 6 were made.

TABLE 6

| Sample No. | Mud from Test V | Additive | Viscosity, cps. | |
|---|---|---|---|---|
| | | | Before | After |
| 1 | 1 | 1.0 lb. NaOH/bbl | 19 | 26 |
| 2 | 4 | 1.0 lb. Quebracho per bbl | 15 | 11 |
| 3 | 7 | 0.5 lb. NaAlO$_2$/bbl | 18 | Plastic |
| 4 | 2 | 1.0 lb. NaOH/bbl | 25 | 25 |
| 5 | 5 | 1.0 lb. Quebracho/bbl | 18 | 11 |
| 6 | 8 | 0.5 lb. NaAlO$_2$/bbl | 19 | 10 |

TEST VII

The following tests were carried out to determine the effectiveness of various water soluble inorganic polyvalent metallic salts in my invention. Portions of a 5.1 per cent suspension of bentonite in water to which was added 2.5 pounds of caustic soda, one pound of quebracho and one pound of the indicated metal salt per barrel of mud was tested according to the procedures used before. The results were as indicated in Table 7.

TABLE 7

| Test No. | Salt, lb./bbl. | Viscosity, cps. | Initial gel, gm. | 10 min. gel, gm. | H₂O loss | pH |
|---|---|---|---|---|---|---|
| 1 | None | 34 | 0 | 50 | 10.0 | 12.5 |
| 2 | Ba(NO₃)₂ | 15 | 0 | 40 | 10.5 | 12.6 |
| 3 | Ca(NO₃)₂ | 20 | 0 | 10 | 10.5 | 12.5 |
| 4 | CrCl₃ | 13 | 0 | 0 | 9.0 | 12.1 |
| 5 | Cu(NO₃)₂ | 24 | 0 | 15 | 9.2 | 12.3 |
| 6 | Fe(NO₃)₃ | 29 | 0 | 70 | 9.5 | 12.3 |
| 7 | Pb(NO₃)₂ | 13 | 0 | 0 | 10.1 | 12.7 |
| 8 | Mg(NO₃)₂ | 19 | 0 | 4 | 10.4 | 12.4 |
| 9 | Ni(NO₃)₂ | 21 | 0 | 4 | 10.5 | 12.2 |
| 10 | Zn(NO₃)₂ | 16 | 0 | 0 | 12.2 | 12.8 |
| 11 | NaAlO₂ | 11 | 0 | 0 | 9.5 | 12.6 |

The exact mechanism by which my invention is effective is not entirely known. It is believed that the various polyvalent metals react with quebracho to form a metal-quebracho lake which results in increased efficiency of quebracho for lowering viscosity. However, my invention is not limited to any one theory of operation. Obvious changes and substitutions may be made in practicing my invention without departing from the ambit thereof. My invention is defined by the following claims.

Having described my invention, I claim:

1. A method for reducing the viscosity of a water base drilling mud having a pH above 7 which comprises concomitantly admixing with said mud sodium meta-aluminate in an amount within the range of 0.01 to 4 pounds per barrel of said mud and quebracho in an amount sufficient to reduce the viscosity thereof.

2. A method for reducing the viscosity of a water base drilling mud which comprises adding to said mud sufficient caustic to adjust the pH thereof to above 7, concomitantly admixing with said mud sodium meta-aluminate in an amount within the range of 0.01 to 4 pounds per barrel of said mud and quebracho in an amount sufficient to reduce the viscosity thereof.

3. A well drilling fluid which comprises, in combination, sufficient water to maintain the mud fluid, sufficient clayey material to form a filter cake on the walls of the well, sufficient caustic soda to maintain a pH above 7.0, from 0.01 to 4.0 pounds per barrel of sodium meta-aluminate, and a sufficient amount of quebracho to produce a drilling fluid having acceptable viscosity, said sodium meta-aluminate and quebracho having been added concomitantly to said drilling fluid.

4. A water base drilling mud comprising an aqueous fluid mixture having a pH above 7 and containing suspended inorganic solids which forms a filter cake on the wall of a well, sodium meta-aluminate in an amount within the range of 0.01 to 4 pounds per barrel of said mud and quebracho in an amount sufficient to reduce the viscosity of said mud, said sodium meta-aluminate and quebracho having been added concomitantly to said drilling mud.

5. A water base drilling mud comprising an aqueous fluid mixture containing suspended inorganic solids which forms a filter cake on the wall of a well, sufficient caustic soda to maintain a pH above 7, sodium meta-aluminate in an amount within the range of 0.01 to 4 pounds per barrel of said mud and quebracho in an amount sufficient to reduce the viscosity of said mud, said sodium meta-aluminate and quebracho having been added concomitantly to said drilling mud.

WILLIAM E. BERGMAN.

References Cited in the file of this patent

UNITED STATES PATENTS

| Number | Name | Date |
|---|---|---|
| 1,999,766 | Lawton et al. | Apr. 30, 1935 |
| 2,211,688 | Byck et al. | Aug. 13, 1940 |
| 2,336,595 | Cannon | Dec. 14, 1943 |
| 2,414,647 | Hoeppel | Jan. 21, 1947 |
| 2,450,936 | Cardwell | Oct. 12, 1948 |
| 2,474,329 | Salathiel | June 28, 1949 |

OTHER REFERENCES

"Role of Clay and Other Minerals in Oil-Well Drilling Fluids." Bur. Mines Pub. R. I. 3556, Stern, pg. 67, February 1941.

Chemical Treatment of Rotary Drilling Fluids, Lawton et al., pg. 370. Reprinted from "Physics," pgs. 365–375, vol. 2, No. 5, May 1932.